(No Model.) 5 Sheets—Sheet 1.

W. M. MORGAN & F. E. PARKER.
PROCESS OF AND APPARATUS FOR ROASTING AND SEPARATING ORES.

No. 605,001. Patented May 31, 1898.

Fig. 1.

Witnesses:
F. G. Fischer
Edward G. Reynolds

Inventors:
Waitman M. Morgan
Francis E. Parker
By Rich & Manning, Atty.

(No Model.) 5 Sheets—Sheet 4.

W. M. MORGAN & F. E. PARKER.
PROCESS OF AND APPARATUS FOR ROASTING AND SEPARATING ORES.

No. 605,001. Patented May 31, 1898.

Witnesses:
F. G. Fischer
Edward G. Reynolds

Inventors:
Waitman M. Morgan
Francis E. Parker
By Rich. H. Manning Atty.

(No Model.)
5 Sheets—Sheet 5.

W. M. MORGAN & F. E. PARKER.
PROCESS OF AND APPARATUS FOR ROASTING AND SEPARATING ORES.

No. 605,001.
Patented May 31, 1898.

Witnesses:
F. G. Fischer
Edward G. Reynolds

Inventors:
Waitman M. Morgan
Francis E. Parker
By Rich'd K. Manning Atty.

UNITED STATES PATENT OFFICE.

WAITMAN M. MORGAN AND FRANCIS E. PARKER, OF KANSAS CITY, MISSOURI.

PROCESS OF AND APPARATUS FOR ROASTING AND SEPARATING ORES.

SPECIFICATION forming part of Letters Patent No. 605,001, dated May 31, 1898.

Application filed October 9, 1896. Serial No. 608,371. (No model.)

*To all whom it may concern:*

Be it known that we, WAITMAN M. MORGAN and FRANCIS E. PARKER, citizens of the United States, residing at Kansas City, in the county of Jackson and State of Missouri, have invented a certain new and useful Process of and Apparatus for Roasting and Separating Ores; and we do hereby declare that the following is a full, clear, and exact description of the invention, reference being had to the accompanying drawings, forming a part of this specification.

Our invention has for its object, first, the separation of the refractory elements from refractory ores and the retention of the metals in a silicious slag in the cupola-furnace; second, the removal of the carboniferous elements of the ores and their subjection to attrition in the settling process; third, the inverting of the silicious slag of the ores after separation from the impurities within the cupola; fourth, to absorb the elements of the refractory ores eliminated by combustion from a series of cupolas from one central point of exhaust, and, fifth, to introduce a flux within the walls of the cupola-furnace and prevent freezing of the impurities.

Our invention consists in the novel means and procedure hereinafter fully described, and specifically pointed out in the claims.

In the drawings,
Fig. 3 is a vertical sectional view of the cupola and fume-precipitating flue, showing a portion of the pipe leading from the flue to the separating-tanks and the spray-tube connected therewith.
Fig. 5 is a plan view of the upper surface of casting upon the top of the scaffold and the flange on the lower tubular joint of the precipitating-flue, showing the antifriction bearing-rollers.
Fig. 9 is a sectional view of the cupola, taken upon the line $x\ x$ of Fig. 3, showing the air-blast tubes around the cupola and also extending within the cupola.
Fig. 12 is a detail broken view of the side portion of the cupola, showing the semicircular pipe within the casing of the cupola.

Similar letters and numerals of reference indicate corresponding parts in all the figures.

Referring to the drawings, 1 represents a drop-bottom cupola-furnace for the roasting of ores which is less than the ordinary height and is constructed with an external casing of iron and an internal lining of fireproof material. Said cupola is mounted upon a hollow base $1^a$ and provided with tap-holes 10 at the bottom. Within the case $7^x$ of the cupola and upon one side of the cupola is a longitudinal section of a pipe 7, which forms a vertical passage and is perforated at suitable points in the direction of its length, as at $7^a$. The vertical edge portions of the pipe extend close in position to the inner surface of the casing, and the curved surfaces fit within a corresponding curved groove made in a vertical direction in the fireproof lining and extending from flange $13^d$ downwardly to within a considerable distance from the bottom of the cupola, the sectional pipe extending in the groove the same described distance, for the purpose hereinafter described. In the opposite side portion of the cupola is a section of a pipe 7, and at each quarter of the circle described by the side of said cupola is a section of a pipe, as described of pipe 7. In the outer casing of the cupola and at the upper end of the section of pipe 7 is an opening in which is inserted a plug 12, the other passages having like plugs 12.

Near the upper end of the cupola is a chute 2, which extends within the cupola, the upper surface of which is inclosed and provided with a conical opening for the passage of the ores. Within the chute 2 is a cone-shaped valve 3, to which is attached a chain $3^a$. Upon the upper surface of the chute is a standard $b'$, and upon the upper end of said standard is balanced a bar $3^c$. To one end of bar $3^c$ is connected the upper end of chain $3^a$. Upon the other end of bar $3^c$ is a weight $3^d$. The bottom of the cupola consists of separate hinged parts 4 4, which are retained in a horizontal position by the removable supporting-bar 11. Upon the top of the cupola is an annular plate 13, which extends a short distance outwardly beyond the outer surface of the case $7^\times$ and to the under side of which is connected rigidly a circular flange $13^d$, which extends around the outer surface of the case $7^\times$ and retains the plate in position.

Figure 2:
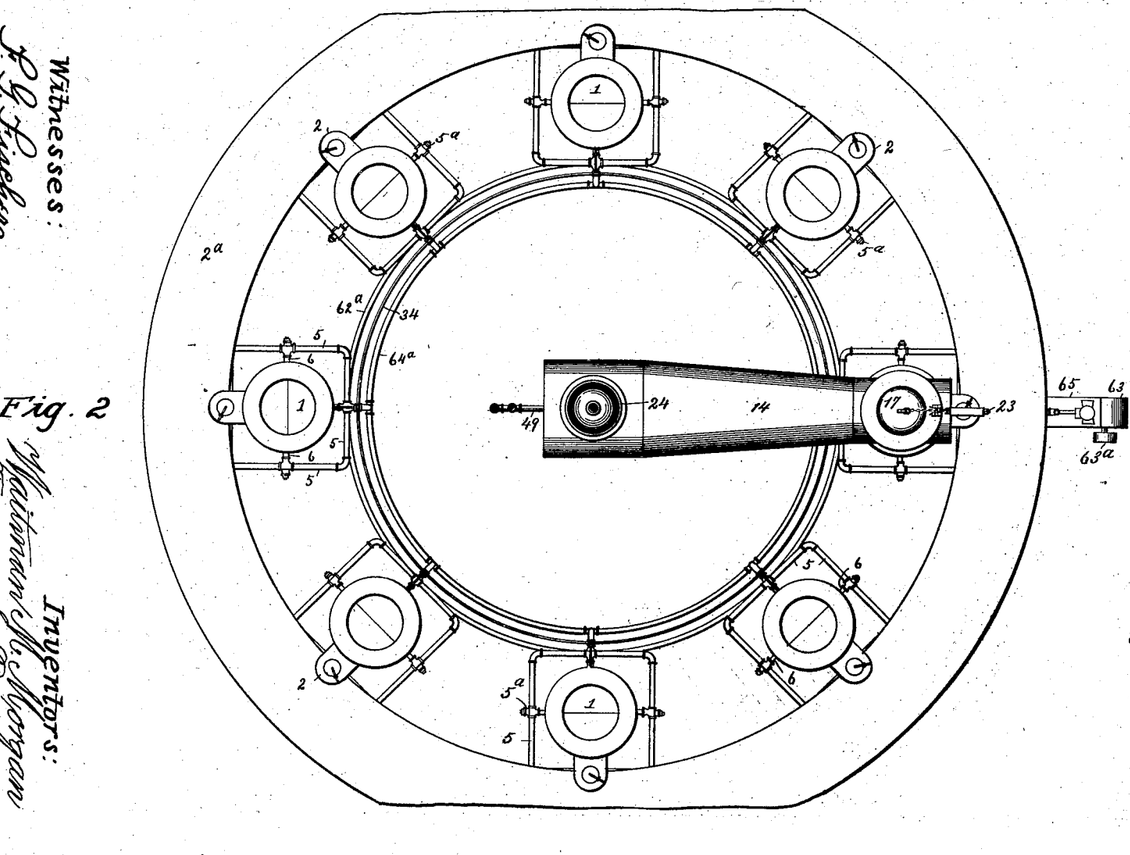
Fig. 2 is a plan view of the series of cupolas, the air and water supply pipes surrounding each cupola, and the pipes in circuit connected with the pipes extending around each cupola and the rotatable fume-precipitating flue, also showing a portion of the engine-operating suction and force pump and also the air-blast fan.

A series of cupolas constructed as hereinbefore described are arranged in position in a circle at suitable distances upon the line of the circle one from another, as shown in Fig. 2, the height of said cupolas being the same. Extending outside of the series of cupolas and entirely around the same at an elevation corresponding to the upper surface of the chute 2 is a circular platform $2^a$, which is supported by the single standard $2^b$, opposite the cupola 1, and also by similar standards opposite the other cupolas in the series of cupolas. At the center of the area from which the position of the series of cupolas is described is placed a scaffold 27, which extends upwardly to a height considerably less than that described by the upper end of the cupola 1. Upon the top of said scaffold 27 is a single casting comprising a flat annular plate 28, to the outer edge of which is connected a downwardly-extended inwardly-inclined circular flange $27^a$. To the sides of the central opening in said circular plate 28 is connected rigidly the upper outwardly-flaring end of a short tube 32. In the lower end of said tube is a screw-threaded opening for the purpose hereinafter described. In the plate 28, at a point a short distance from the point of connection of the upper end of the tube 32 with the annular plate 28, is a depression or pocket 29 of considerable depth, in which is a metal ball 30. In the bottom of the pocket 29 is a screw-threaded opening in which is fitted an adjusting threaded bolt 31, which is operated from a position beneath the pocket against the ball 30. Other pockets are made in the annular plate 28 upon a line concentric with the opening in said plate, which are provided with antifriction-balls and screw-bolts, in the same manner as described of the pocket 29. Between the pockets 29 and the outer edge of the annular plate 28 is an upwardly-extended annular flange $28^a$.

For the purpose of conducting the fumes from each cupola and precipitating the same during the roasting of the ores in one of the cupolas a case 14, circular in cross-section, is constructed, which extends over the annular plate 28 on the scaffold 27 in one direction and over the annular plate on the top of the cupola in the other direction. The portion of the case 14 mounted on the scaffold is nearly of the same diameter, and from said portion the sides of the case gradually contract in width and are made to taper to a position a short distance from the cupola, and the remainder of the case extending over the cupola has its sides extending in straight lines.

In the under side portion of the case 14, directly above the annular plate 28, is a circular opening, around which and bolted to the case is a branch tube 26. The branch tube 26 is provided with a flange $26^a$ at its upper end, which is bolted to the case 14, and a flange $26^b$, extending at right angles to the tube, which rests upon the upper surface of the annular plate 28 and within the annular flange $28^a$ and rests upon the antifriction-balls 30. At the other end of case 14 and directly over the opening in the cupola 1 is an opening around which is a short flue 15, upon the upper end of which is a flange $15^a$, which is bolted to the case 14, and upon the lower end a flange $15^b$, extending at right angles to the said flue and the under surface of which rests upon the upper surface of the annular cap-plate 13 on the cupola.

Beneath the vibrating end of the precipitating-flue 14 and extending within the described circle upon which the cupolas in series are arranged is a circular track-rail 34, which is arranged nearly in the same plane as that described by the upper surface of the flange $15^b$ of the flue 15. Said track-rail is supported in position at the proper distance from the cupola by the bracket 35, which is bolted to the side of the rail at one end and to the casing of the cupola at the other.

Upon the track-rail 34 and beneath the vibrating end of the flue 14 is a carriage which is composed of a semicircular plate 36, which extends beneath the flue and partially the distance on each side in an upward direction and is bolted to said case. From said plate 36 extends downwardly on one side of the flue the forked extensions 40 41, and in the sides of which extensions is journaled an eccentric axis 38, and upon which axis is mounted a grooved wheel 37, which is provided with a central opening in line with its axis to receive the eccentric axis 38. Upon one end of the axis 38, which extends beyond the outer side portion of the forked bearing 41, is connected a lever 39, which raises the vibrating end of the flue 14 a short distance in an upward direction. Upon the other side of the flue are downwardly-extended forked lugs, in which is journaled grooved roller 37, which is connected with the lugs or extensions in precisely the same manner as described of the one roller 37.

In the upper side portion of the vibrating end of the flue 14, directly above the opening in the cupola, is an opening corresponding in size thereto, around which and bolted to the exterior side of the flue or case is an annular flanged extension 16. Upon the upper edge of the extension 16 is a flange $16^a$, extending at right angles therefrom. Upon the upper side portion of the flange $16^a$ is a lug $16^b$, to which is pivotally attached a cover 17. Upon the outer vibrating end of the case or flue 14 is attached rigidly a yoke $21^a$, one end of which is attached to the lower portion of the side of the case and the other end to the upper portion of the side of the case. From said yoke is extended a collar $21^b$. To said collar is attached the lower end of a standard 21, and to the end of the yoke connected with the flue 14, near the upper side of the same, is connected the lower end of a standard $27^d$, both of which standards extend an equal height and are connected by a transverse bar at their upper ends. In the upper end of standard $27^d$ is a pulley 19, over which extends a chain 18, one end of which chain is connected with the cover 17, which extends over the opening on the upper side of the flue 14, and with the other end of said chain is connected a weight 20. In the collar $21^b$ is a valve-stem 23, which extends through the opening $22^c$ in the end of the case or flue 14, and upon the end of the stem within the case is attached a valve 22, which closes the opening $22^c$. Around the valve-stem 23 is a spiral spring $24^a$, one end of which bears upon the end of the case 14 and the other end upon the plate $21^c$ on the stem on the inner side of yoke $21^a$.

In the pivotal end of flue 14, directly over the opening on the lower part of the case or flue, is an opening corresponding in size, and to the outer portion of said case or flue and extending around said opening is rigidly attached a dome 24, of ordinary construction, for the ascent and collection of gases.

Upon the platform 46, which is supported in position in any suitable manner a suitable height above the vibrating flue 14 of the ore-roasting plant, is arranged in position a tank 45, supplied with water. With the under side portion of the tank 45 is connected one end of a pipe 48 by means of a union-coupling 73, the other end of which pipe extends downwardly to a position in rear of the pivotal end of the case or flue 14, and a perforated extension 49 of said pipe extends horizontally within the flue a short distance above the inner surface of the lower side portion of said flue and to a point near the contracted end portion of the flue. Said pipe is provided with a valve $48^a$. With the side of the tank 45 is connected one end of a pipe 44, the other end of which pipe extends downwardly to a position beneath the top portion of the scaffold 27 for the purpose hereinafter described.

In the threaded opening of the tube 32, which forms a part of the casting, and the annular plate 28 upon the top of scaffold 27 is inserted the upper end of an externally-threaded pipe 33, the lower end of which pipe is connected with the induction-opening in the suction and force apparatus 50, arranged upon the ground directly beneath the top of the scaffold. Said suction and force apparatus is of the ordinary and well-known description and is operated by the vertical steam-engine $51^a$, the steam being supplied from a boiler located at a convenient point and which is not shown in the drawings.

In the pipe 33, near the upper end, is a three-way pipe-joint 42. Within the opening at right angles to said pipe 33 is inserted the lower end of the pipe 44. Within the joint 42 and extending over the opening to the pipe 44 is a perforated spraying-disk 43. In the pipe 44 is a valve $44^a$.

Extending around the cupola 1, about one-fourth the distance from the base $1^a$, of the height of the cupola, is a pipe-frame 5, composed of short sections of pipe connected together by elbow-joints at the four ends of the frame. Each section of pipe equidistant from the ends of the pipe-frame is separated into two parts, and with said parts is connected a four-way pipe-joint $5^a$. In the opening in the pipe-joint $5^a$, extending outwardly and at right angles to the section of pipe 5, is fitted a removable plug $5^b$. In the opening in the pipe-joint $5^a$, extending in the direction of the cupola, is connected one end of a short section of pipe 6, (see Figs. 3 and 9,) the other end of which pipe extends through the casing of the cupola, and also the interior fireproof lining, at a point intersecting the lower end of the passage formed by the same cylindrical pipe 7, and in the tube 6, directly beneath and communicating with said passage, is a perforation $6^a$. With each said pipe-joint $5^a$ is connected a tube which extends within the cupola in precisely the same manner as described of the one tube 6. With one of the four-way pipe-joints $5^a$, opening in an opposite direction from the cupola, is connected one end of a pipe 62, the other end of which pipe extends beneath the surface of the ground or the base $1^a$ of the cupola, thence outwardly beyond the circle of the cupolas and the cupola 1 and connected with a rotary air-blast fan 63 of the usual well-known construction.

Upon the driving-shaft of the fan (see Fig. 2) is a pulley $63^a$, (see Fig. 1,) which is driven by an endless belt 63$^b$, which is connected with a pulley 63$^c$, arranged above the pulley 63$^a$, and which pulley is upon a driving-shaft and driven by a suitable belt from an engine. (Not shown in the drawings.) In the pipe 62 is a valve 62$^b$. Directly beneath pipe-frame 5$^a$, extending around the cupola 1, is a pipe-frame 8, constructed precisely the same as the frame 5 and provided with inlet-tubes 9, extending within the cupola the same described distance as the tube. Around each one of the cupolas in series are pipe-frames the same as frame 8. Outside of the series of cupolas and adjacent to the cupola 1 and the blast-fan 63 is a suction and force apparatus 65, which is precisely the same as the suction and force apparatus 50, and which is driven by an engine of the same description as the engine 50. With the induction-opening of said suction and force apparatus is connected one end of a pipe 66, the other end of which pipe extends in an upward direction and nearly to the elevated platform 46, and thence bent at an angle and extends toward the dome 24 on the fume-precipitating flue 14 and connected with the upper part of said dome by means of a union-coupling 25, thus permitting the independent rotation of the dome.

Upon the platform 46 are a series of tanks 68 69 71, tanks 69 71 holding crystallizing solutions. With the bottom of tank 68 is connected the upper end of a short section of pipe 67, the lower end of which pipe is connected with the pipe 66. With the tank 69 and pipe 66 is connected a short pipe 70 in the same manner as pipe 67. With the tank 71 and pipe 66 is connected a short section of pipe 72 in the same manner as described of pipe 67. In the pipe 67 is a valve 67$^a$, and in the respective pipes 70 72 are like valves which regulate the flow of the water and solutions from the respective tanks. In the pipe 66 between the dome 24 and pipe 67 is a valve 25$^a$. With the eduction-opening to the suction and force apparatus 65 is connected one end of a pipe 64, the other end of which pipe is connected with the four-way pipe-joint in the pipe-frame 8 at a point directly beneath the four-way pipe-joint 5$^a$, with which the pipe 62 is connected. In the pipe 64 is a valve 64$^c$. In the pipe 62, near the plane of the ground, is a four-way pipe-joint 62$^c$. With one of the side openings in the pipe-joint 62$^c$ is connected one end of a section of pipe 62$^a$, which extends to the pipe-joint in a frame extending around an adjacent cupola, and from each frame is extended a similar pipe extension 62$^a$, which is connected with another pipe-joint in another frame, so that each pipe-frame is connected with a circular pipe connection. In the pipe 64 are four-way pipe-joints in a line horizontal with the pipe-joints 62$^c$ and with which are connected sections of pipe 64$^a$ at one end, the other end being connected with the pipe-joint in one of the pipe-frames surrounding an adjacent cupola, the other frames extending around the other cupolas in the series being connected in the same manner.

At a suitable distance from the series of cupolas and upon a lower plane than that upon which the cupolas are erected are a series of settling-tanks 52, 56, and 60, these tanks being arranged, preferably, at a suitable distance from the cupola 1. With the suction and force apparatus 50 is connected one end of a pipe 51, the other end of which pipe is extended to and through the side of the tank 52 at a point about one-third the distance from the bottom and extended to a position equidistant from the sides of said tank and bent upwardly at right angles at 51$^b$. A portion of the top of the settling-tank 52$^a$ is hinged to the side of the tank and provided with a lap-joint, the other part being firmly connected with the sides of the tank. At one side of the lap-joint in the top of the tank is a circular pipe-opening within which is arranged a pipe 75. Upon the lower end of pipe 75 is a centrally-perforated plate 75$^a$, the outer edges of which are inclined downwardly, and with said edge portion is connected a convex wire disk 73, the outer edges of which extend from a position a short distance from one inner side portion of the tank to a short distance from the other side, and is elevated a considerable distance above the end 51$^b$ of the pipe 51. Within the pipe 75 is a shaft 76, the lower end of which extends through the opening in the plate 75$^a$ and to which end is connected a circular downwardly-inclined plate 76$^a$. To the outer edges of the plate 76$^a$ is connected a convex wire disk 74, which is nearly of the same dimensions as the disk 73, and is arranged close in position to the disk 73, so as to be free from contact.

Upon the portion of the pipe 75 outside of the tank 52 is an adjustable collar 75$^d$, which rests upon the top of the tank and prevents the downward movement of the disk 73.

To the outer side of the settling-tank 52, in the direction of the cupola 1, is attached the lower end of a standard 83$^a$, the upper end of which extends a considerable height above the tank. With the outer side of the tank 60 is connected a standard 83$^b$, which is the same height as standard 83$^a$. With the upper end of each standard 83$^a$ 83$^b$ is connected a cross-beam 83. Upon the under side of beam 83 are the shaft-hangers 83$^d$, in which is journaled a line-shaft 82, and upon said shaft is a pulley 81, which pulley is driven by a belt from the engine, which transmits power to the pulley 63$^c$ and operates the blast-fan.

Upon the upper end of the pipe 75, operating the disk 73, which extends upwardly nearly to the line-shaft 82, is a miter-gear 77, and upon the end of the line-shaft is a miter-gear 80, which meshes with the gear 77. The upper end of the shaft 76 extends upwardly above the plane of the line-shaft 82, and upon said end is a miter-gear 79, which meshes with the gear 80, whereby the rotation of shaft 82 rotates the pipe 75 and the shaft 76 in opposite directions.

In the bottom of the tank 52 is a door 52° for the removal of deposits. With the opposite side of the tank 52 to that supporting the standard 83ª is connected one end of a platform 52°, the other end of which platform is connected with the adjacent side of tank 56. Upon the platform 52° is mounted a suction and force apparatus which is the same as the suction and force apparatus 65. Said apparatus 54 is operated by an engine driven by steam and from the same source as that conveyed to the engine 51ª. With the induction-opening in the suction and force apparatus 54 is connected one end of a pipe 53, the other end of which pipe extends through the top portion of the tank and within the tank a suitable distance. With the eduction-opening of the apparatus 54 is connected one end of a pipe 55, the other end of which pipe extends through the side of tank 56 and into said tank in the same manner as described of the pipe 51. With the tank 56, which is constructed in the same manner as the tank 52, are oppositely-rotatable wire disks, which are the same as disks 73 74, and with which are connected a pipe and shaft which are precisely the same as shaft 76 and pipe 75. Upon the other end of the line-shaft 82 from that having miter-gear 80 are also miter-gears, and also upon the upright shaft and tube, as described, upon the one end of said shaft. Connected with the adjacent sides of the tanks 56 and 60 is a platform 56ª, upon which is mounted a suction and force apparatus 58, which is the same as the apparatus 54 and operated by an engine which is constructed in the same manner as the engine 51ª and the steam supplied from the same source. With the eduction-opening to the apparatus 58 is connected one end of a pipe 57, the other end of which pipe extends within the tank 56, as described of the pipe 53. To the eduction-opening of the suction and force apparatus 58 is connected one end of a pipe 59, the other end of which pipe extends through the side of the tank 60 at the same height as described of pipe 55. In the pipe 55 is a valve 55ª, and on the pipe 59 is a valve 59ª. At the upper end and to the side of the tank 60 is connected an overflow-pipe 61.

In preparing the plant for the economical separation and roasting of the ores the cupola 1 is charged in the ordinary manner, the ores and flux being introduced through the opening in the top of the chute 2, the weight of the ores forcing the valve 3 downward and retaining it below the opening until the desired quantity of ore is placed in the cupola with a sufficient quantity of flux and fuel to separate the refractory elements of the ores, the weight 3ª overcoming the gravity of the valve and closing the opening.

Figure 1:
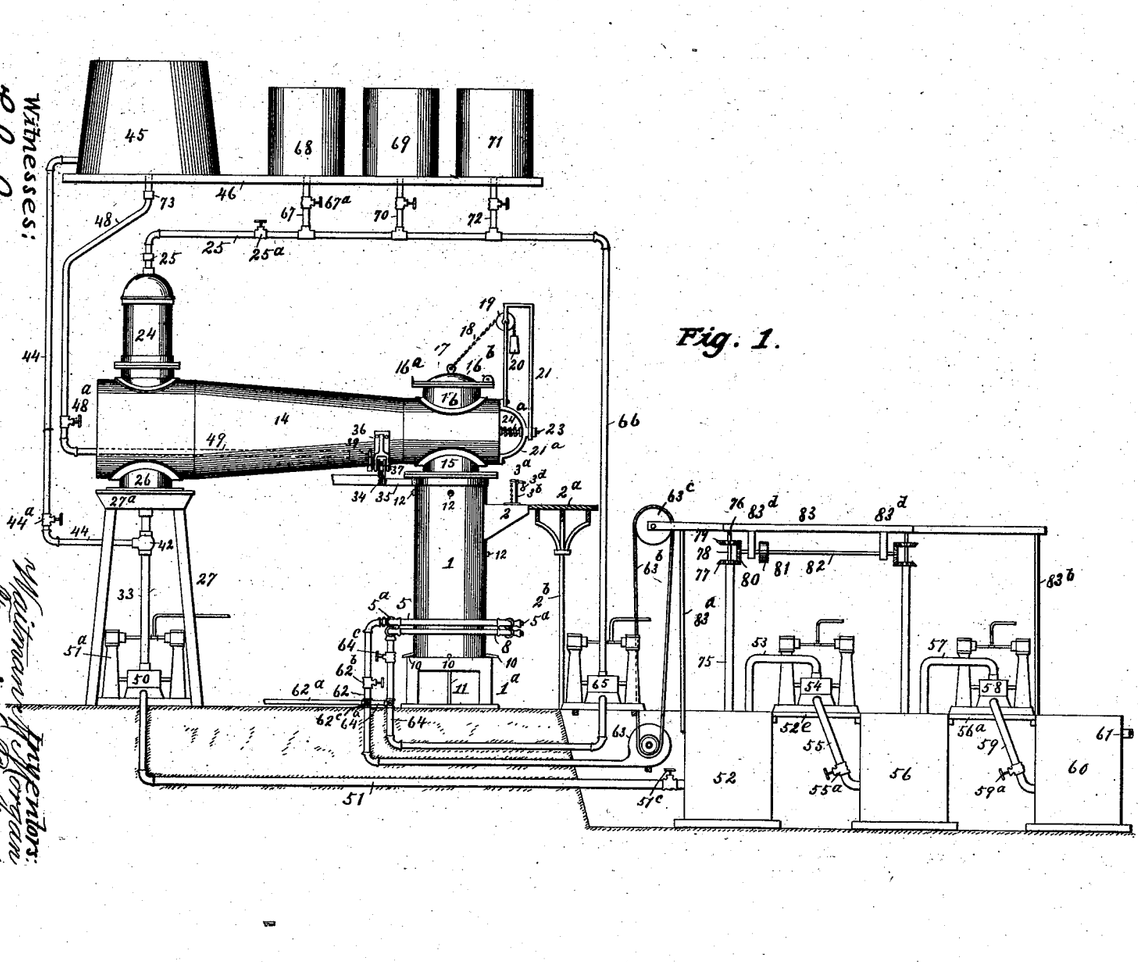
Figure 1 is a view in elevation of our improved ore roasting and separating plant.
Figures 3, 9, 12:
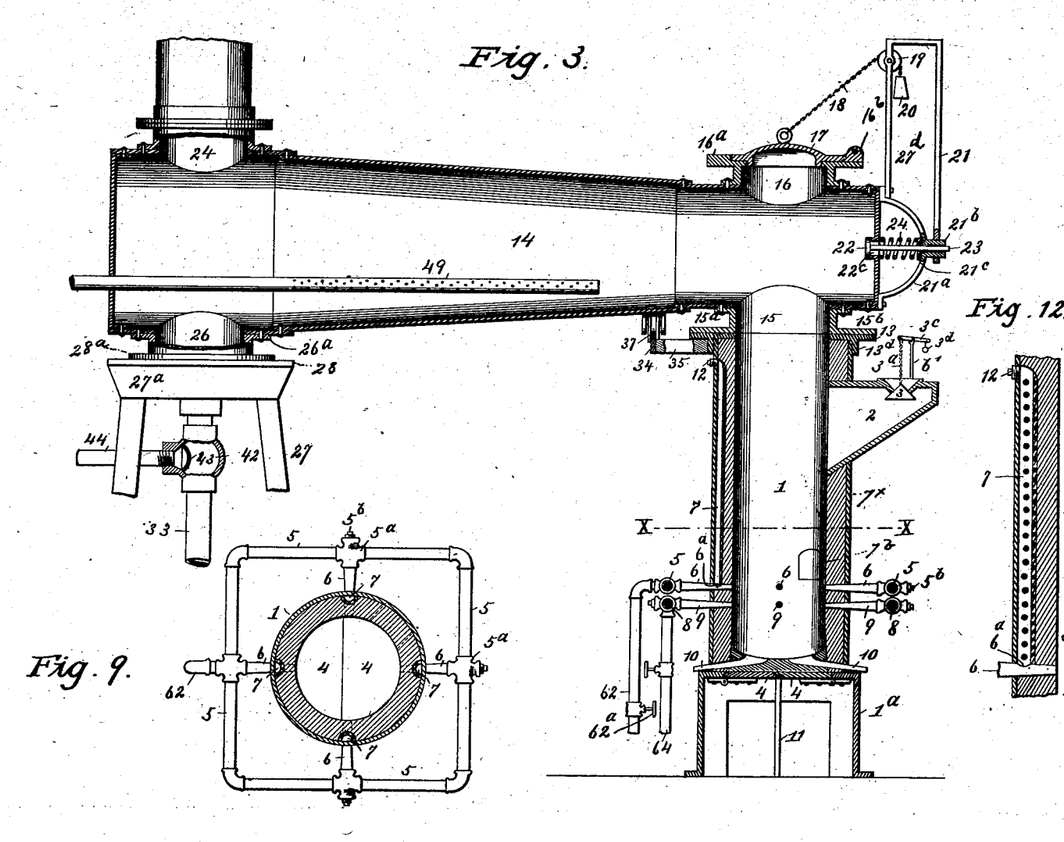
Figure 4:
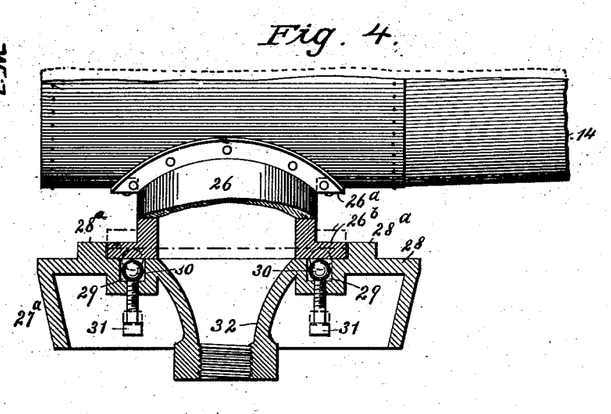
Fig. 4 is a broken detail view of the lower portion of the fume-precipitating flue and the upper portion of the scaffold supporting the inner pivotal end of the said flue, showing the adjustable ball-bearings.
Figure 5:
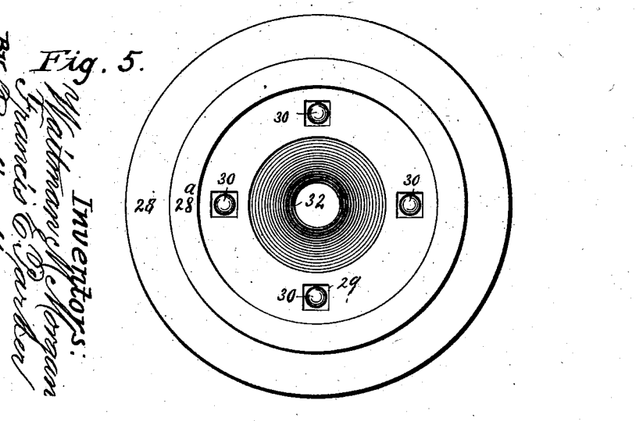
Figure 6:
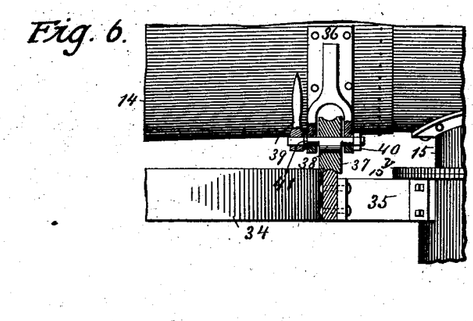
Fig. 6 is a broken detail view of the forward vibrating end of the fume-precipitating flue and also a broken view of the upper portion of the cupola, showing a portion of the circular track supporting the said end of the flue and the ribs on the cupola supporting said track, also showing the grooved wheels supporting the flue and upon the track and the eccentric axis to said wheels.
Figures 7, 8:
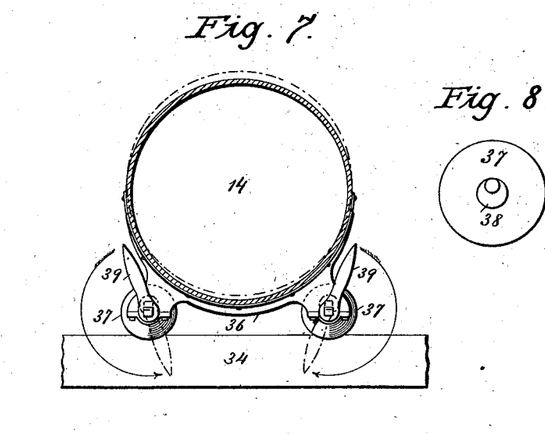
Fig. 7 is a sectional view of the fume-precipitating flue as seen in Fig. 6, showing a portion of the circular track-rail, the grooved wheels, and the levers operating the eccentric at the axis of each wheel.
Fig. 8 is a detail view of one of the grooved wheels, showing the eccentric.
Figure 10:
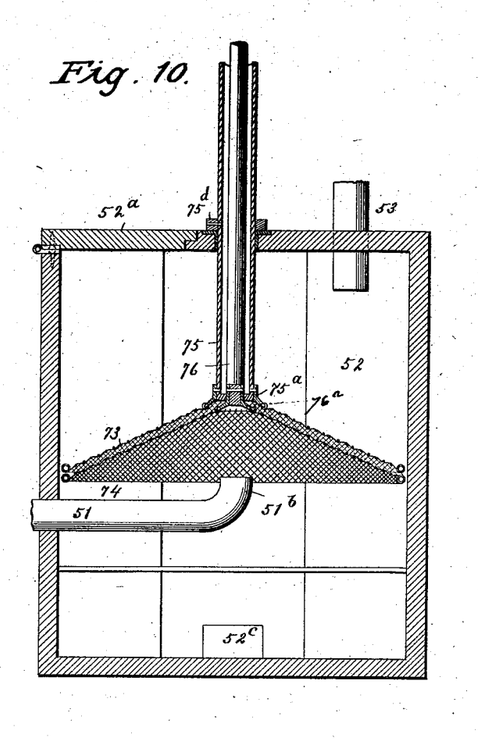
Fig. 10 is a vertical sectional view of one of the settling-tanks for the carboniferous deposits, showing the end of the delivery-pipe within the tank and the oppositely-moving attrition-disks.
Figure 11:
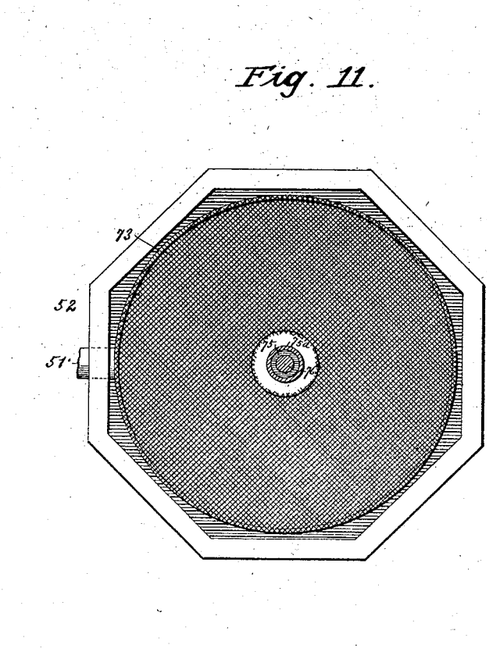
Fig. 11 is a plan view of the settling-tank as seen in Fig. 10 with the top removed, showing the rotary disks.

During the charging of the chute the fume-precipitating flue 14 is connected with the top of the cupola, as seen in Figs. 1 and 3. The tank 45 upon the elevated platform 46 is supplied with water, and also the tank 68, and within the tanks 69 71 is a liquid composed of salt and pulverized granite mixed with water. Salt may also be used by itself in the treatment of certain kinds of ores, as further specified. The fuel in the cupola being ignited, free combustion of the coal mixed with the ores is obtained as follows: Steam is admitted to the engine 51ª and the suction and force apparatus 50 caused to draw upon the air in the cupola and exhaust the air in the fume-precipitating flue 14, carrying off the carboniferous portion of the products of combustion in the following manner: While the preliminary exhaust of the air within the flue 14 is being maintained by a slow movement of the engine 51ª the valve 48ª is opened sufficiently to send a small stream through the perforated pipe 49 within the flue, which precipitates the smoke or carbon, and the precipitate is drawn through the suction and force apparatus and forced through the pipe 51 into the settling-tank 52.

In the treatment of refractory ores containing the metals of intrinsic value, such as gold and silver, the gold, which is oxidated, passes from the cupola in minute particles mixed with the carbon liberated by combustion in the cupola. In the treatment of such ores, for which the improved plant is especially designed, and the treatment of the ores at certain stages of separation of the mineral and metallic elements of the ores, as hereinafter defined, within the cupola the steps of the procedures under ordinary conditions of ores consist first in the treatment of the sulfids of iron and arsenids as they are liberated from the ores. The cupola is first charged with the ores containing the gold and silver, these ores being considered now under treatment, as they are contained in a more refractory gangue than other kinds of ore. In charging the cupola the ores and fuel, consisting of charcoal or coke and a sufficient amount of flux only to cause the impurities to go off in the fumes, are placed within the cupola. The fuel is then ignited in the lower part of the cupola, access to which is obtained through the door 7ᵇ, and the combustion of the fuel, with which the ores are mixed as it increases, produces an intense heat. During the time the suction and force apparatus 50, as heretofore stated, is exhausting the air in the flue 14 power is applied from an engine to the pulley 63°, which is transmitted to the belt 63ᵇ and thence to the blast-fan 63 and from said fan to frame 5, thence through tube 6 to the cupola, and a constant draft is maintained in the cupola, increasing the combustion of the fuel. The liberation of the sulfids of iron and arsenids, which in ordinary roasting of ores freeze upon the lining of the cupola, is observed by removing one of the plugs 5ᵇ in the pipe-frame 5, the action of the blast-fan being temporarily suspended for the purpose. As soon as the free movement of the sulfids and arsenids is observed the principal step taken is to prevent the fall of these refractory elements into the flux, such as lead, which latter under the incipient heat falls into the bottom of the furnace, and also to prevent further elimination of the fumes of the sulfur and arsenic. As observed through the opening afforded by the removal of the plug $5^b$ in the pipe-frame, the sulfids and arsenids in the condition when freed from the ores by the flux are of a ropy or glutinous consistency and depend from the ores in filaments, which indicates that there was not sufficient flux with the ores in the cupola to carry off these impurities at the time, but to liberate them from the ores. The next step is to deaden these filaments and prevent their further movement, or from going into the molten lead at the bottom of the furnace and refluxing with the lead. The plugs 12 in the outer lining of the cupola are removed and the passages formed by the semicircular pipe of each filled with a proper flux, such as lime, and the plug replaced. The fan 63 is caused to again operate and a siphonage produced by the air-blast upon the flux in the passage and the flux forced within the cupola as it is drawn through the aperture $6^a$ in the tube 6, which, coming in contact with the sulfids and arsenids, commingle, the oxids passing off with the carbon and the sulfurous acid also with the fumes. The sulfids and arsenids which fall in the direction of the bottom of the cupola and are not volatilized are deadened by the flux and form with the flux a slag and are prevented from going back into the ores again, which slag is thus free from action of the fire and is subsequently drawn from the cupola through the door $7^b$. As soon as complete combustion of the fuel takes place the ores freed from volatilized impurities described and the sulfids and arsenids are loosely retained in place in the cupola, and the excess of lime which enters from below is drawn upward and unites with the silicious impurities of the ores and forms a glass.

During the roasting the light gases from the cupola rise within the dome 24, and for the purpose of utilizing the gas for increasing combustion the valve $67^a$ admits water from tank 68 within the pipe 66 in small quantities and the valve $25^a$ admits the gas into said pipe from the dome 24. The engine operating the suction and force apparatus 65 is set in motion and the water and gas in the proper quantity forced through pipe 64, thence through the pipe-frame 8 to the cupola, and a hydrocarbon gas formed within the cupola by the intense heat. As soon as the sulfids and arsenids have been wholly thrown down under the roasting process the valves $67^a$ and $25^a$ are closed and the valves in the branch pipes 70 72, leading from the tanks 69 and 71, are opened to admit the investing minerals and liquid into pipe 66, which is forced by the suction and force apparatus 65 through the pipe-frame 5 within the cupola. The fume-precipitating flue is then removed from its position on the top of the cupola and a sufficient quantity of the dissolved granite and common salt introduced within the top of the cupola, which liquid percolates the mass and invests or incrustates the outer surface of the metal-bearing slag under the intense heat, which slag forms a matrix for the metals. In these steps in the ore-reduction the metals become molten within the vitreous slag, as before stated, by the action of the heat and flux upon the silicious impurities of the gangue of the ores, and as soon as the investing mineral cools it crystallizes upon the slag and prevents the atmosphere from causing oxidation of the molten metals within the vitreous slag. A shrinkage follows the cooling of the slag, and the molten gold and silver will unite in globules and remain within the slag. At this stage in the process of separation the invested or incrustated slag containing the gold and silver is in condition for removal from the cupola and treated as free-milling ore, and in the meantime all of the remaining cupolas in the series of cupolas are charged and ready for the roasting process.

In the heretofore-described mixture of the minerals, salt and pulverized granite, the granite (preferably feldspathic) fuses and forms a haloid mineral with the salt, the alkali in the decomposed feldspar uniting with the silica of the slag, and the reaction forms a silicate of potash.

In the roasting process and during the highest stage of combustion of the fuel in the cupola the action of the engine 50 is increased, and in this case an excess of the products of combustion and fumes will pass through the moistened atmosphere produced by the cooling-spray from the pipe 49 through the pipe 33. In order to thoroughly dilute the carbon, the valve $44^a$ is opened and water admitted to pipe 44 and sprayed through the perforated disk 43 in passing the joint 42 in pipe 33. A fluid, with the solid matter of the products of combustion, carbon being in excess, which hold gold and silver mixed therewith, flows constantly into tank 52. Power is communicated to the engines operating the respective suction and force apparatus 54 and 58 and also the line-shaft 82, and the disks 73 and 74 in the tanks 52 and 56 are caused to rotate in opposite directions, the suction and force apparatus 54 drawing the fluid mixture from the tank 52 and forcing the same into the tank 56, and in said operation the bubbles and accretions of carbon in the fluid are separated by attrition in passing between the respective revolving disks 73 74 in tank 52 and also in the tank 56, the heavy insoluble matter remaining in the tank being removed from the bottom of the tank through the door $52^c$. The fluid in the tank 56 is forced into the tank 60, and this separation is simply the overflow from the pipe 61, the sediment in each settling-tank being removed and treated for the recovery of the fine gold and silver in the usual manner. Should the action of the suction and exhaust apparatus 50 create a greater vacuum in the flue 14, for its safety the valve 22 opens automatically and admits the external air in sufficient quantity to overcome the outside pressure on the flue.

During the first stages of roasting the ores and where from well-known causes explosions occur in the cupola and the ores are thrown upward the danger to the flue 14 is obviated, the discharged ores throwing up the cover or valve 17, which is held by a compensating weight 20, so as to yield without resisting the passage of the ores.

When it is desired to change the position of the vibrating end of the flue on the top of the cupola 1 to the position on the top of an adjacent cupola in the series of cupolas, the levers 39 are thrown downwardly, and the eccentric axis of each wheel 37 on track 34 raises the end of flue 14 on the cupola a slight distance in an upward direction. On the scaffold 27 the adjusting-bolts 31 are turned slightly, so as to raise the balls 30 against the under side of the plate 26$^b$ and raise the plate a slight distance, the vibrating end of the flue is released of its bearing on plate 13 on the cupola, and the plate removed to the plate on an adjoining cupola upon the antifriction bearing-rollers 30 and circular track-rail 34. The flue is then in position to receive the carboniferous products of combustion from the cupola, and the operation and processes as heretofore described are repeated.

In certain kinds of ores zinc flux is employed, and the same flux is introduced beneath the ores and forced within the cupola. To prevent the refractory elements of ores adhering to the lining of the cupola and also the heat from contracting the lining, and thus preventing the direct action of the heat upon the metallic elements of the ores, common salt is placed in the pipe 7$^a$, which enters the perforated portion 7$^a$ of the section of pipe 7, and thus obtains direct contact with the lining and causes the expansion of the lining, the moisture in the salt being taken up by the lining during evaporation by heat, the effect of the salt thus applied drawing the lining away from the ores and the sulfids and arsenids during reduction of the ores, which have a tendency to "freeze" upon the lining. The metal-bearing crystallized slag removed from the cupola is then subjected to the usual crushing process and the metals obtained economically and with less expense than in the processes heretofore employed. The flue 14 may be employed for gas-furnace plants and also the air-exhaust system. Our improved process is applicable to all ore-roasting furnaces.

Having fully described our invention, what we now claim as new, and desire to secure by Letters Patent, is—

1. The herein-described process of treating refractory ores in ore-roasting furnaces consisting first in roasting the ores with a flux and simultaneously drawing air through the heated ores, and separating the sulfur and arsenic and also the sulfids and arsenids from the ores, and then investing the slag containing the metal with a separate mineral after the separation in the furnace.

2. The herein-described process of treating refractory ores in ore-roasting furnaces consisting first in roasting the ores with a flux, simultaneously drawing air through the heated ores, and separating the sulfur and arsenic, then fluxing the arsenids and sulfids beneath the ores, and then investing the silicious slag containing the metal with a salt, within the furnace.

3. The herein-described process of treating refractory ores in ore-roasting cupola-furnaces, consisting in roasting the ores with a flux, and simultaneously drawing air through the heated ores, thereby separating the sulfur and arsenic, fluxing the arsenids and sulfids beneath the ores, drawing lime through the heated ores and then investing the silicious slag containing the metal with salt and pulverized granite.

4. In ore roasting and separating plants a cupola, a horizontal detachable fume-arresting case having one end supported by the said cupola, separate openings in said end, a pivotal support at the other end of said case, a hinged cover to one of the separate openings, a chain connected with said cover and a weight upon said chain, said chain having a roller-support as and for the purpose described.

5. In ore roasting and separating plants, a cupola and a horizontal, detachable fume-arresting case, having one end provided with an opening and supported by said cupola, a pivotal support at the other end of said case, and a fume-discharging pipe connected with said case as and for the purpose described.

6. In ore roasting and separating plants a cupola, a horizontal detachable fume-arresting case, having an opening for the entrance of the fumes at one end, and supported by said cupola, a pivotal support at the other end of said case, a discharge-pipe for the fumes, connected with the pivotal end of said case, a fume-precipitating perforate pipe within said case, and a fluid-supply pipe connected with the said perforate pipe, said fume-arresting case, having its bottom inclined downwardly at an angle to its support and in the direction of the said fume-discharging pipe as and for the purpose described.

7. In ore roasting and separating plants, a series of ore-roasting cupolas in a circuit, a scaffold within the series of the cupolas and equidistant from each cupola, a horizontally-extending fume-arresting case or flue, having an opening in its vibrating end extending over one of said cupolas, a fume-discharging pipe, a plate upon said scaffold having antifriction devices, and an extension in said case having a flange bearing upon said antifriction device as and for the purpose described.

8. In ore roasting and separating plants the combination with one or more ore roasting and separating cupolas in a circuit, of a scaffold within the series of cupolas and equidistant from each cupola, a horizontally-extending fume-arresting case or flue, having an opening in its vibrating end extending over one of said cupolas, a discharge-pipe for the said fumes, a pivotal support for said case upon said scaffold, a circular track-rail with the series of cupolas, and beneath the vibrating end of said case, a support for said rail-rollers on said case and resting on said rail, and eccentric axis to said rollers as and for the purpose described.

9. An ore roasting and separating cupola having vertical passages between the lining to the cupola and its outer casing, and a perforate lining to each of said passages as and for the purpose described.

10. In fume-arresters for ore roasting and separating plants, a case for the fumes, having a vibrating outer end, and a pivotal inner end, an extension to said case having a flange and a supporting-plate beneath said flange, having pockets and antifriction-rollers in said pockets, and adjusting-bolts in said pockets beneath said rollers, as and for the purpose described.

11. In separating plants for ores, &c., a settling-tank, a supply-pipe and a discharge-pipe connected with said tank, separate perforate disks in said tank, a shaft connected with one of said disks and a concentric pipe or tube connected with the other disk and power-conveyers connected with said shaft and pipe as and for the purpose described.

12. In a separating plant for ores, &c., a settling-tank, a supply-pipe and a discharge-pipe connected with said tank, a vertical shaft and a concentric pipe or tube within said tank, a perforate convex disk on the lower end of the respective shaft and tube, separate miter-gear on the upper end of the respective shaft and tube, a power-conveying shaft and a miter-gear on said shaft meshing with the miter-gear on the said shaft and tube as and for the purpose described.

13. In a separating plant for ores, &c., a settling-tank, a pipe having its lower end extending within said tank, a convex wire disk on the said end of said pipe, a miter-gear upon its upper end, a shaft within said pipe and a convex wire disk upon the lower end of said shaft, a miter-gear upon its upper end, a power-conveying shaft, a miter-gear on said shaft meshing with said miter-gear on the upper ends of the respective shaft and tube carrying said disks, a supply-pipe to the settling-tank having its inner end extending to a position beneath the wire disks, and a discharge-pipe in the side of said tank as and for the purpose described.

WAITMAN M. MORGAN.
FRANCIS E. PARKER.

Witnesses:
 ERASTUS SMITH,
 S. L. C. HASSON.